US008067913B2

(12) United States Patent
Watabe et al.

(10) Patent No.: US 8,067,913 B2
(45) Date of Patent: Nov. 29, 2011

(54) POWER TOOL

(75) Inventors: Shinji Watabe, Ibaraki (JP); Kazutaka Iwata, Ibaraki (JP); Nobuhiro Takano, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 554 days.

(21) Appl. No.: 12/233,852

(22) Filed: Sep. 19, 2008

(65) Prior Publication Data

US 2009/0096401 A1 Apr. 16, 2009

(30) Foreign Application Priority Data

Sep. 21, 2007 (JP) ................................ 2007-245752

(51) Int. Cl.
*H02P 7/00* (2006.01)

(52) U.S. Cl. ..................... 318/446; 318/244; 318/254.1; 318/461

(58) Field of Classification Search .................. 318/244, 318/245, 254.1, 254.2, 446, 461, 474; 173/213, 173/217, 221, 170
See application file for complete search history.

(56) References Cited

U.S. PATENT DOCUMENTS 5,731,673 A 3/1998 Gilmore
6,392,373 B1 * 5/2002 Glasgow et al. .............. 318/430
7,112,934 B2 * 9/2006 Gilmore ........................ 318/432
7,282,880 B2 * 10/2007 Glasgow et al. .............. 318/280
7,646,157 B2 * 1/2010 Cruise et al. .................. 318/161
7,759,898 B2 * 7/2010 Brotto ........................... 320/114
7,821,217 B2 * 10/2010 Abolhassani et al. ........ 318/432
2007/0069672 A1 3/2007 Glasgow et al.

FOREIGN PATENT DOCUMENTS

JP 2000-024960 1/2000
JP 200024960 1/2000
JP 2007-196363 8/2007
JP 2007196363 8/2007

OTHER PUBLICATIONS

Chinese Office Action, with English translation, issued in Chinese Patent Application No. 200810161805.9, mailed Feb. 12, 2010.

* cited by examiner

*Primary Examiner* — Walter Benson
*Assistant Examiner* — Thai Dinh
(74) *Attorney, Agent, or Firm* — McDermott Will & Emery LLP

(57) ABSTRACT

The controller determines the presence or absence of operation of the trigger switch according to an ON/OFF state of the main contact of the trigger switch and designating the rotation speed of the motor based on a signal outputted from the speed contact. The controller stops the rotation of the motor, after the trigger switch is activated and the main contact is turned ON and the motor is driven according to a signal outputted from the speed contact, when an OFF state of the main contact is detected, only in the case where a signal value outputted from the speed contact is a predetermined value or less.

10 Claims, 5 Drawing Sheets

POWER TOOL

BACKGROUND OF THE INVENTION

1. Field of the Invention

The present invention relates to a power tool configured to control the rotation speed of a motor in accordance with an amount of operation of a trigger switch.

2. Description of the Related Art

There are power tools which rotate tip tools such as a drill, driver, or a like by using a motor as a driving source. Of these types of power tools, there is a power tool which controls the rotation speed of a motor in accordance with an amount (degree) of operation of a trigger switch. In general, such power tool is configured to control the rotation speed of a motor by varying a voltage applied to the motor in accordance with an amount (degree) of operation (stroke) of the trigger switch.

Generally, the power tool of this type increases (or decreases) a voltage applied to the motor in accordance with an increase (or a decrease) in the amount of operation (stroke) of the trigger switch to exert control so that the rotation speed of the motor is raised (or decreased). Such the control prevents a rapid rise in the rotation speed of the motor at a time of start of operations and rotates the motor at a low speed to make it possible to easily position a tip tool in an object to be worked or to enhance ease of working.

A power tool to perform such control as above is disclosed in, for example, Unexamined Japanese Patent Application KOKAI Publication No. 2000-024960. The power tool disclosed in the publication determines, in accordance with an ON/OFF state of a main contact of a trigger switch, whether the trigger switch has been operated or not. The power tool also determines the rotation speed of a motor based on a signal from a speed contact of the trigger switch. The speed contact changes output voltage thereof in accordance with the amount of operation (stroke) of the trigger switch.

Further, a power tool is proposed which uses a brushless motor in order to achieve long life of the power tool. Unexamined Japanese Patent Application KOKAI Publication No. 2007-196363, for example, discloses a power tool using a brushless motor.

When the start or stop of the motor is controlled in response to only an ON/OFF state of a main contact, there is a possibility that, regardless of whether an operator has moved his/her hands off the trigger switch, the main contact is turned OFF due to some reasons such as vibration, noise, or the like. When the main contact is turned OFF, the motor also stops regardless the operator has not moved his/her hands off the trigger switch.

SUMMARY OF THE INVENTION

In respect of the above, an object of the present invention is to provide a power tool which is capable of preventing a motor from being stopped regardless of whether an operator has removed his/her hands off a trigger switch.

To achieve the object, a power tool according to the first aspect of the present invention, comprises:

a motor;

a trigger switch being a trigger switch operated by an user having a main contact being turned ON by operations of the trigger switch and a speed contact to output a speed signal having a signal level corresponding to an amount of operation of the trigger switch; and driver to determine the presence or absence of operations of the trigger switch according to an ON/OFF state of the main contact of the trigger switch and to control the motor so that, when it is determined that the trigger switch has been operated, the rotation speed of the motor becomes a rotation speed corresponding to an amount of operation of the trigger switch based on a speed signal from the speed contact;

wherein the driver stops the motor, when the main contact is turned OFF, if the level of the speed signal outputted from the speed contact is less than a set level.

For example, the driver maintains the rotation of the motor if the level of the speed signal outputted from the speed contact is the set level or more even when the main contact is turned OFF. In this case, for example, the driver stops the motor if an OFF state of the main contact continues for a predetermined period of time even when the level of the speed signal outputted from the speed contact is the set level or more.

For example, the driver stops the motor, when the main contact is turned OFF after the motor started once, if the level of the speed signal outputted from the speed contact is less than the set level.

For example, the driver starts the rotation of the motor when the main contact is turned ON and when the speed contact outputs a speed signal designating a rotation speed.

For example, the main contact of the trigger switch comprises an ON/OFF switch and is turned ON when an amount of operation of the trigger switch is a first reference amount or more, and the speed contact of the trigger switch comprises a potentiometer and outputs, when an amount of operation of the trigger switch is equal to or greater than a second reference amount being larger than the first reference amount, a speed signal having a signal level which is raised with an increase in the amount of operation of the trigger switch.

For example, the driver circuit comprises a controller and an inverter circuit to supply power to the motor under the control of the controller and wherein the controller controls the inverter circuit so that the motor is made to rotate at a speed corresponding to a speed signal outputted from the speed contact while the main contact is turned ON and controls the inverter circuit so that the motor is made to stop when the level of the speed signal outputted from the speed contact is less than a reference level while the main contact is turned OFF.

A power tool according to the second aspect of the present invention comprises:

a motor;

an operation unit to be operated by a user;

operation determining unit configured to determine the presence or absence of an operation of the operation section;

operation amount detecting unit configured to detect an amount of operation of the operation section; and driver configured to control the motor, when the operation determining unit determines that an operation performed by the operation section exists, at a rotation speed corresponding to an amount of operation detected by the operation amount detecting unit;

wherein the driver, when the operation amount detecting unit determines that no operation performed by the operation section exists, stop the motor if an amount of operation detected by the operation amount detecting unit is less than a reference amount.

For example, the driver, even when the operation determining unit determines that no operation of the operation section exists, maintains rotation of the motor if an amount of operation detected by the operation amount detecting unit is a predetermined reference amount or more. In this case, for example, the driver, even when an amount of operation detected by the operation amount detecting unit is the predetermined reference amount or more, stops the motor if a period during which it is determined by the operation determining unit that there exists no operation continues for a predetermined period of time.

With the above configurations, the occurrence of the malfunction of stopping of a motor against an operator's will can be prevented.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An impact driver of an embodiment of the present invention is described with referring to attached drawings below.

First, with referring to FIG. 1, mechanical configurations and operations of the impact driver 1 will be described.

Figure 1:
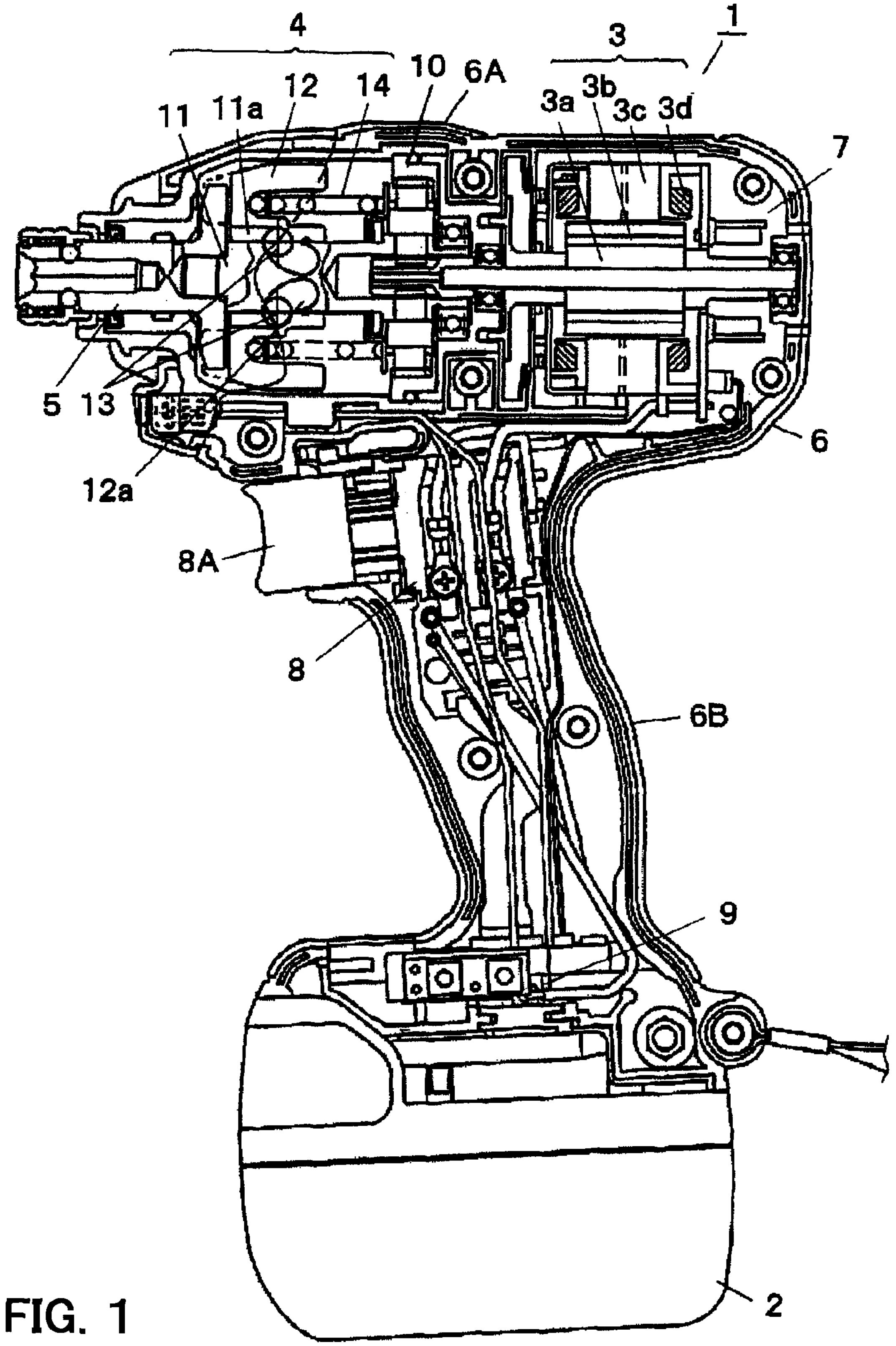
FIG. 1 is a cross-sectional view of an impact driver according to an embodiment of the present invention.

The impact driver 1 of the embodiment, as shown in FIG. 1, includes a battery 2, a motor 3, a rotation/impact mechanism 4, an anvil 5, a housing 6, an inverter section 7, a trigger switch 8, and a control section 9. The rotation/impact mechanism 4 is driven by using a chargeable battery 2 as a power source and the motor 3 as a driving source. The rotation and impact mechanism 4 provides rotational impact (rotation and impact) to the anvil 5 serving as an output shaft by driving the motor 3. The anvil 5 transfers the rotational impact provided from the rotation/impact mechanism 4 to tip tools such as a driver bit mounted on the anvil 5 to perform work such as screwing or the like.

The motor 3 is made up of a brushless DC (Direct Current) motor and is housed in a cylindrical body portion 6A of a T-shaped housing 6 seen from the side. The inverter section 7 to drive the motor 3 is placed in the backward portion (right in FIG. 1) of the body portion 6A. The trigger switch 8 is placed in the upward portion in a handle section 6B extending from the body portion 6A of the housing 6 in approximately rectangular and integrated manner. The trigger switch 8 is provided with an operation section 8A. The operation section 8A is urged to protrude from the handle section 6B by a spring. The control section (control substrate) 9 is housed in the downward portion of the handle section 6B. The control section 9 controls the rotation speed of the motor 3 in accordance with a depressing operation of the operation section 8A.

The control section 9 is electrically connected to the battery 2 and the trigger switch 8. The battery 2 is provided detachably in the downward portion of the handle section 6B of the housing 6.

The rotation/impact mechanism 4 is embedded in the body portion 6A of the housing 6 and includes a planetary gear 10, a spindle 11, and a hammer 12. When the operation section 8A is depressed to start the motor 3, the rotation speed of the motor 3 is reduced by the planetary gear 10 and the rotation is then transferred to the spindle 11. Then, the spindle 11 is made to rotate and to be driven at a predetermined speed. The spindle 11 and hammer 12 are coupled to each other by cam mechanism. The cam mechanism is constituted of a V-shaped spindle a cam groove 11*a* formed at an outer surface of the spindle 11, a hammer cam groove 12*a* formed at an inner surface of the hammer 12, and a ball 13 connected to these cam grooves 11*a* and 12*a*.

The hammer 12 is urged (pushed) to a tip direction (left direction in FIG. 1) by the spring 14 always. A clearance is interposed between the hammer 12 and the end surface of the anvil 5 due to the connection between the ball 13 and cam grooves 11*a* and 12*a* at rest. Two unillustrated convex portions are formed on each of the hammer 12 and anvil symmetrically.

As described above, when the spindle 11 is rotated and driven, its rotation is transferred via the cam mechanism to the hammer 12. At this time point, before the hammer 12 rotates half-around, the convex portions of the hammer 12 are engaged with (or hit) the convex portions of the anvil 5, thereby rotating the anvil 5. By the reaction force caused by the engagement (hit), relative rotation occurs. As a result, the hammer 12 begins to be backed off toward the motor 3 along the spindle cam groove 11*a* while compressing the spring 14.

Due to the backing-off of the hammer 12, the convex portions of the hammer 12 get over the convex portions of the anvil 5 and the engagement between the hammer 12 and anvil 5 is released. Then, the hammer 12 undergoes acceleration rapidly, due to elastic strain energy accumulated in the spring 14 and actions of the cam mechanism besides rotary force of the spindle 11, toward the rotation direction and forward. Then, the hammer 12 moves forward due to the force given by the spring 14 and the convex portions of the hammer 12 engage with the convex portions of the anvil 5, resulting in rotation in an integrated manner. Since strong rotational impact force is applied to the anvil 5 from the hammer 12, the rotational impact force is transferred to screws through a tip tool (not shown) mounted on the anvil 5. Thereafter, the same operations as above are repeated so that the rotational impact force is intermittently transferred from a tip tool to screws, which are screwed into an unillustrated object to be fastened such as lumber or the like.

Figure 2:
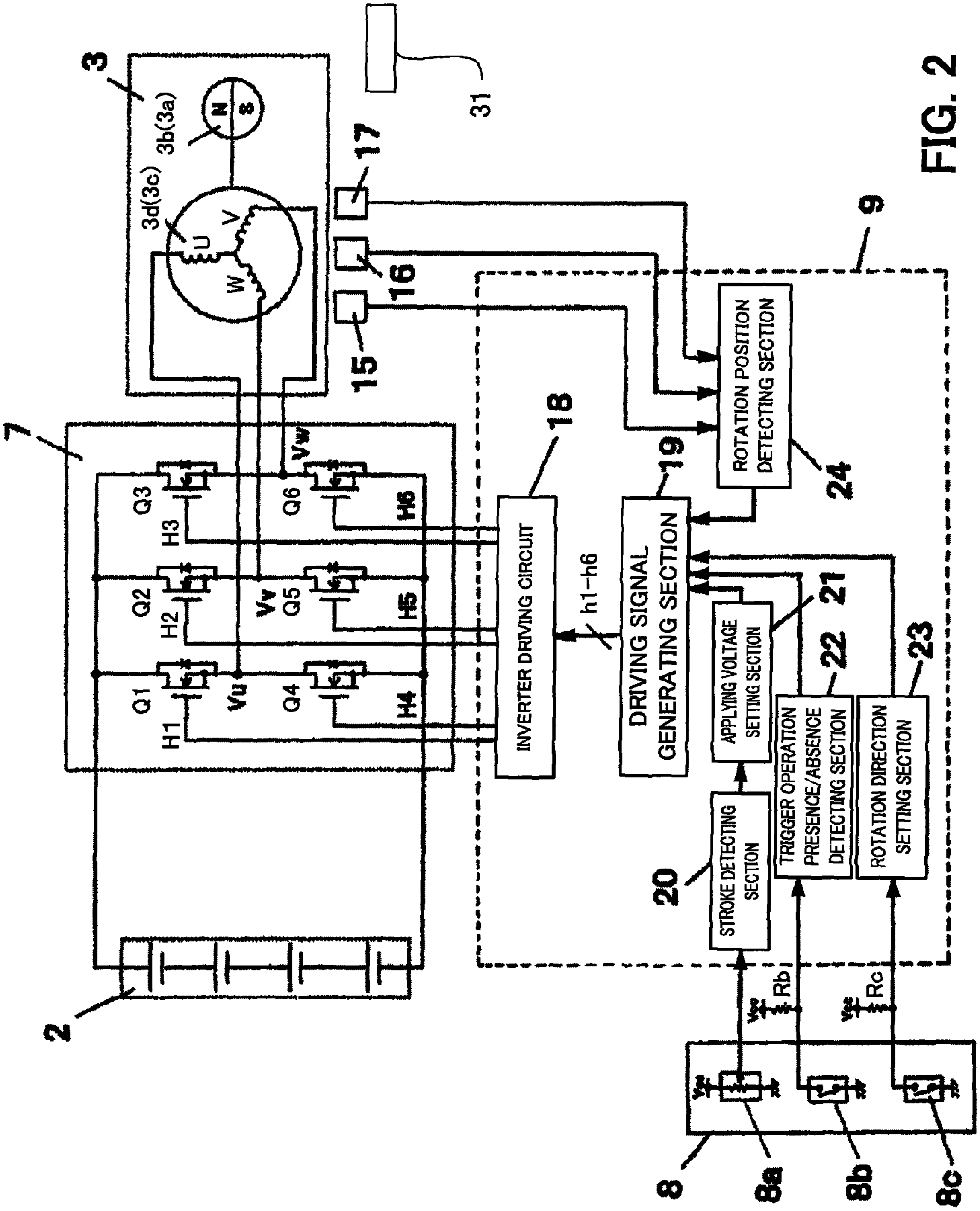
FIG. 2 is a block diagram showing configurations of a driving control system of a motor of the impact driver according to the embodiment of the present invention.
Figure 3:
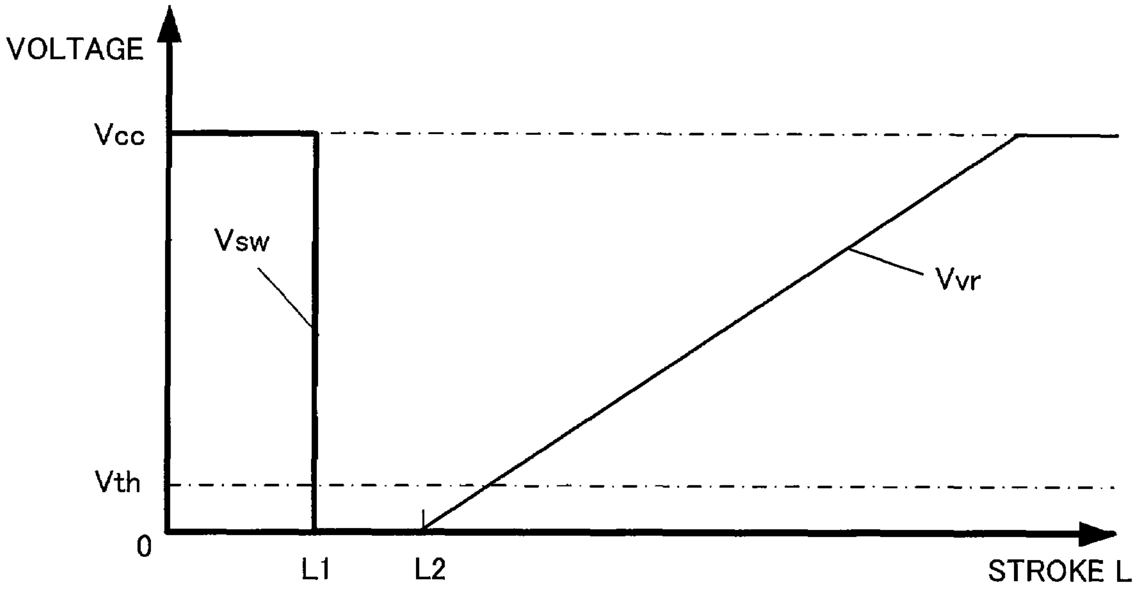
FIG. 3 is a diagram showing a change in each voltage signal from a main contact and speed contact responding to an amount of operation (stroke) of a trigger switch.
Figures 4A, 4B, 4C, 4D, 4E, 4F:
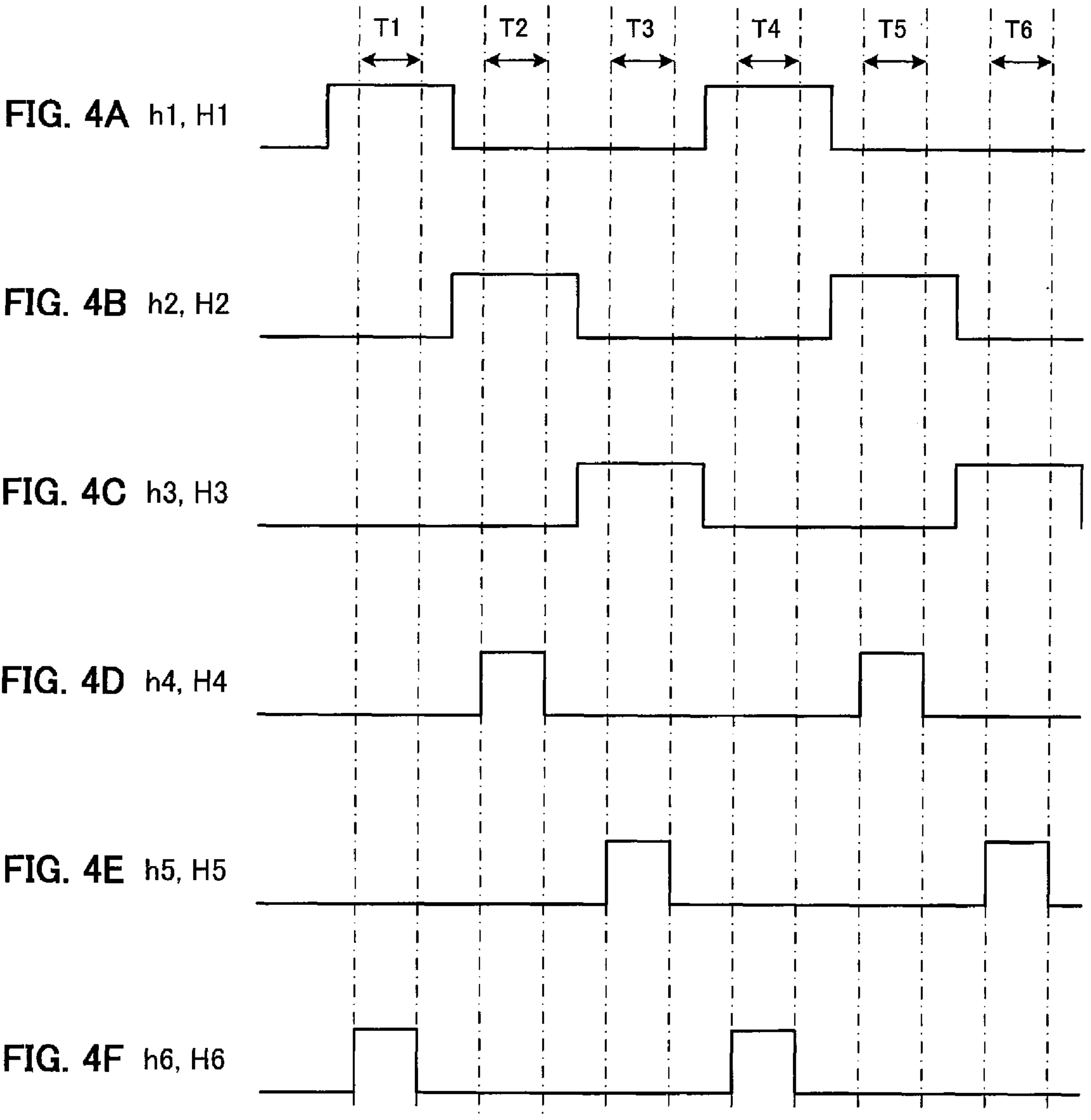
FIGS. 4A to 4F are timing charts explaining driving signals h1 to h6 and switching signals H1 to H6 generated by a driving signal generating section and an inverter driving section.

Next, configurations and actions of a driver (driving/control systems) of the motor 3 are described referring to FIGS. 2 and 3. As shown in FIG. 2, the power tool 1 includes a battery 2, a motor 3, an inverter section 7, a trigger switch 8, a controller 9, and a brake 31.

The battery 2 is a rechargeable secondary battery.

The motor 3 is made up of a three-phase brushless DC motor. This brushless DC motor is an inner rotor type. The motor 3, as shown in FIG. 1, includes a rotor (magnet rotor) 3*a* and a stator 3*c*. Further, the motor 3, as shown in FIG. 2, has three rotation position detecting elements (Hall elements) 15, 16, and 17 to detect a rotation position of the rotor 3*a*. The rotor (magnet rotor) 3*a* is made up of an embedded permanent magnet containing a pair of N pole and S pole. The three rotation position detecting elements (Hall elements) 15, 16, and 17 are arranged at an angle of 60 degrees in a peripheral direction to detect the rotation position of the rotor 3*a*. The stator 3*c* has an armature winding 3*d*. The armature winding 3*d* is made up of star-connected three-phase stator windings U, V, and W.

The inverter section (power converting section) 7 has six FETs (Field Effect Transistors) Q1 to Q6, which are hereinafter referred to switching elements and connected in a three-phase bridge manner and flywheel diodes each connected between a collector and emitter of respective one of the switching elements Q1 to Q6. A gate of each of the six bridge-connected switching elements Q1 to Q6 is connected to an inverter driving circuit (interface section) 18. Further, a drain or a source of each of the six switching elements Q1 to Q6 is connected to the stator windings U, V, and W. The six switching elements Q1 to Q6 perform switching operations (ON/OFF operations) in response to the switching signals H1 to H6 supplied from the controller 9, converts a DC voltage outputted from the battery 2 into three-phase (U-phase, V-phase, and W-phase) voltages Vu, Vv, and Vw, and supplies these converted voltages to the stator windings U, V, and W.

Out of the switching element driving signals (three-phase signals) to drive the six switching elements Q1 to Q6, the switching signals H4, H5 and H6 for three switching elements Q4, Q5, and Q6 on the negative (low) power voltage side are PWM (Pulse Width Modulated) signals. The controller 9 controls or changes the pulse width (duty ratio) of each of the PWM signals based on a detecting signal representing amount of operation (stroke) L of the operation section 8A of the trigger switch 8 to control electrical power to the motor 3.

The PWM signals are supplied to either of the switching elements Q1 to Q3 at the positive power voltage side of the inverter section 7 or the switching elements Q4 to Q6 at the negative power voltage side. Thus, the switching elements Q1 to Q3 or the switching elements Q4 to Q6 are switched at a high speed and, as a result, power to be supplied to each of the stator windings U, V, and W is controlled based on a DC voltage from the battery 2. In the present embodiment, PWM signals are supplied to the switching elements Q4 to Q6 on the negative power voltage side.

The trigger switch 8 has a speed contact 8*a*, a main contact 8*b*, and a forward/reverse rotation contact 8*c*.

The speed contact 8*a* is comprised of a linear potentiometer (variable resistor) and outputs a speed signal. The speed signal has a voltage Vvr according to an amount of operation (amount of withdrawal, stroke) L of the operation section 8A, as shown in FIG. 3. More specifically, the voltage Vvr of the speed signal outputted from the speed contact 8*a* is made to remain 0V until the operation section 8A is depressed (pulled, triggered) and the amount of operation (stroke) L reaches L2 and, when the amount of operation (stroke) L reaches L2, the voltage Vvr of the speed signal rises linearly up to 0V to a reference voltage Vcc (5V) approximately in proportion to the increase in the stroke L.

The main contact 8*b* is comprised of an ON/OFF switch or the like and its output terminal is pulled up by a resistor Rb. The main contact 8*b* output a signal (ON/OFF signal) having a voltage Vsw designating ON/OFF of the motor 3. The main contact 8*b* is in an OFF state while the operation section 8A is not operated and, as shown in FIG. 3, outputs the signal having a reference voltage Vcc (for example, 5V, High) as a voltage Vsw. On the other hand, the main contact 8*b*, when the operation section 8A is depressed and its stroke L reaches L1 (<L2), is turned ON and the voltage Vsw of the signal becomes 0V (low).

The impact driver 1 has a forward/reverse rotation switching lever to switch the direction of rotation of the motor 3. The forward/reverse rotation contact 8*c* is turned ON/OFF in synchronization with the forward/reverse rotation lever. The output terminal of the forward/reverse rotation contact 8*c* is pulled up by the resistor Rc. The forward/reverse rotation contact 8*c* is tuned OFF when the forward/reverse rotation switching lever provides an instruction for forward rotation of the motor 3 and outputs the reference voltage Vcc (for example, 5V) as a voltage signal. On the other hand, the forward/reverse rotation contact 8*c* is turned ON when the forward/reverse rotation lever provides an instruction for reverse rotation of the motor 3 and its output voltage is 0V.

The control section 9 is made up of a microcomputer having a CPU (Central Processing Unit) to output a driving signal based on a processing program and data, a ROM (Read Only Memory) to store the processing program and/or data, a RAM (Random Access Memory) to store data on a temporary basis, and a timer function. The control section 9 functionally includes a driving signal generating section 19, the inverter driving circuit 18, a stroke detecting section 20, an applying voltage setting section 21, a trigger operation presence/absence detecting section 22, a rotation direction setting section 23, and a rotation position detecting section 24.

The stroke detecting section 20 detects stroke L being an amount of withdrawal of the operation section 8A based on the voltage Vvr of the speed signal to outputted from the speed contact 8*a* of the trigger switch 8. The applying voltage setting section 21 sets a voltage to be applied to the motor 3 according to the stroke L of the operation section 8A detected by the stroke detecting section 20. The trigger operation presence/absence detecting section 22 detects the presence or absence of the operation of the operation section 8A based on the voltage Vsw of the ON/OFF signal inputted from the main contact 8*b* of the trigger switch 8.

The rotation direction setting section 23 detects switching of the rotation direction of the motor 3 by detecting the output signal from the forward/reverse rotation contact 8*c* and sets a rotation direction of the motor 3. The rotation position detecting section 24 detects a positional relation among the rotor 3*a* and the stator windings U, V, and W of the stator 3*c* based on a signal outputted from each of the three rotation position detecting elements 15, 16, and 17.

The driving signal generating section 19 generates, when the trigger operation presence/absence detecting section 22 detects that the operation of the operation section 8A of the trigger switch 8 has been performed, the driving signals h1 to h6 to switch the switching elements Q1 to Q6, as shown in FIGS. 4A to 4F, in accordance with to the signal outputted from the rotation direction setting section 23 and the rotation position detecting section 24.

The inverter driving circuit 18 converts a voltage level of each of the driving signals h1 to h6 to generate switching signals H1 to H6 and supplies the generated switching signals H1 to H6 to gates of the switching elements Q1 to Q6, respectively. This causes the switching elements Q1 to Q6 to be sequentially turned ON/OFF.

Further, the driving signal generating section 19 makes the driving signals h4 to h6 for the three switching elements Q4, Q5, and Q6 on the negative power voltage side out of the six switching elements Q1 to Q6 be PWM signals. More in detail, the driving signal generating section 19 changes a pulse width (duty ratio) of each of the driving signals h4 to h6 and controls a voltage to be supplied to the motor 3 so that an applying voltage set by the applying voltage setting section 21 (voltage set based on the amount of operation (stroke) L of the operation section 8A of the trigger switch 8) can be obtained. As a result, for example, during periods T1 and T4 in which the driving signals h1 and h6 (switching signals H1 and H6) are both at a high level, a driving current flows through the windings U and V and during periods T2 and T5 in which the driving signals h2 and h4 (switching signals H2 and H4) are both at a high level, a driving current flows through the windings W and U, and during periods T3 and T6 in which the driving signals h3 and h5 (switching signals H3 and H5) are both at a high level, a driving current flows through the windings V and W. Thus, the start/stop of the motor 3 can be controlled by controlling power to be supplied to the motor 3 based on the ON/OFF of the operation section 8A, and the rotation speed of the motor 3 can be controlled by controlling power to be supplied to the motor 3 in a manner to correspond to the operation amount L of the operation section 8A.

Moreover, in the present embodiment, since the PWM signals are supplied to the switching elements Q4 to Q6, by controlling pulse widths of the PWM signals, electrical power to be supplied to the stator windings U, V, and W can be controlled, thereby controlling the rotation speed of the motor 3. The brake 31 shown in FIG. 2 reduces the rotation speed of the motor 3.

Figure 5:
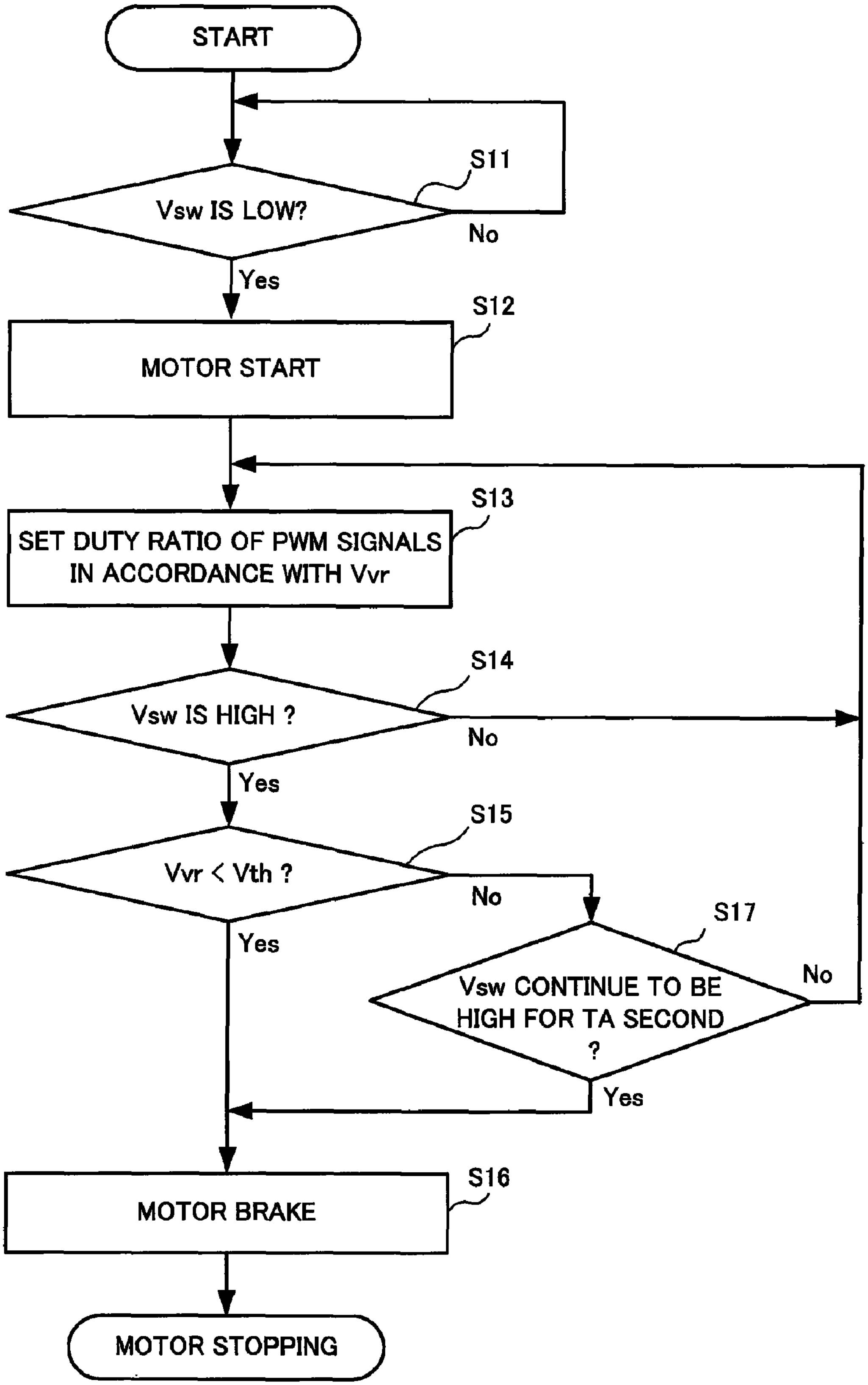
FIG. 5 is a flowchart showing driving control procedures of a motor of the impact driver according to the embodiment of the present invention.

Next, operations of the motor 3 of the impact driver 1 of the present embodiment are described with referring to the flowchart in FIG. 5.

An operator turns on an unillustrated main switch when using the impact driver 1. This causes power for driving the control section 9 to be supplied thereto and the control section 9 starts the operations shown in FIG. 5. First, the control section 9 determines whether or not the voltage Vsw of the ON/OFF signal outputted from the main contact 8*b* is low (0V) (Step S11). At an initial stage, the operation section 8A is not depressed, the stroke L of the operation section 8A is 0, the main contact 8*b* is in an OFF state and the voltage Vsw of the ON/OFF signal outputted from the main contact 8*b* is high (Vcc: 5V). Therefore, in the Step S11, the determination result is "No". When the operator activates (depresses) the operation section 8A and the stroke L of the operation section 8A reaches L1 shown in FIG. 3, the main contact 8*b* is turned ON and the voltage Vsw of the ON/OFF signal from the main contact 8*b* changes from a high level (Vcc: 5V) to a low level (0V). Then, the voltage Vsw of the ON/OFF signal is determined as a low level (Step S11: Yes). Then, the driving signal generating section 19 of the control section 9 supplies the switching signals H1 to H3 to the switching elements Q1 to Q3 (step S12). The stroke detecting section 20 detects the stroke L of the operation section 8A based on the voltage Vvr of the speed signal from the speed contact 8*a* and outputs it to the applying voltage setting section 21. At an initial stage, the stroke L of the operation section 8A is within L1 to L2 and the applying voltage setting section 21 sets the duty ratio at 0 (step S13). This causes the driving signal generating section 19 to set a duty ratio of each of the driving signals h4, h5, and h6 and the switching signals H4, H5, and H6 at 0 (step 13). As a result, the switching elements Q4 to Q6 continue to be in an OFF state and, therefore, the motor 3 does not rotate. Then, when the stroke L reaches L2 and thereafter, an operation voltage is boosted (or dropped) with an increase (or decrease) in the stroke L. This causes the duty ratio to become large (or small) (step S13). As a result, power supplied to the motor 3 becomes large (or small) and a torque increases (or decreases) and the rotation speed of the rotor 3*a* becomes high (or low). Further, in the present embodiment, an effective voltage applied to the motor 3 is boosted with the increase in the stroke L of the operation section 8A. This causes the rotation speed of the motor 3 to become high in proportion to the stroke L of the operation section 8A.

Next, whether or not the voltage Vsw of the ON/OFF signal outputted from the main contact 8*b* is high is determined (Step S14). When it is determined that the voltage Vsw is low (step S14: No), the control section 8A is still depressed and, the control goes back to step S13. As a result, the motor 3 continues the operation as it is. On the contrary, if it is determined that the voltage Vsw is high (step S14: Yes), the trigger operation presence/absence detecting section 22 of the control section 9 determines that operator's hands have been removed off the operation section 8A. In this case, it is detected whether or not the voltage Vvr of the speed signal output from the speed contact 8*a* is lower than a threshold voltage Vth (Vvr<Vth) (Step S15).

If the voltage Vvr is lower than the threshold voltage Vth (Step S15: Yes), that is, when the voltage Vsw of the ON/OFF signal from the main contact 8*b* is high and the voltage Vvr of the speed signal from the speed contact 8*a* is lower than the threshold voltage value Vth, it is determined that the operator has truly removed his/her hands off the operation section 8A. The control section 9 lets all the switching signals H1 to H6 be at a low level and stops the supply of power to the motor 3 (Step S16). Further, when necessary, an unillustrated motor brake is activated, thereby stopping the rotation of the motor 3.

On the other hand, if it is detected that the voltage Vvr of the speed signal is the voltage Vth or more (step S15: No), that is, if the voltage Vsw of the ON/OFF signal is high and the voltage Vvr of the speed signal is the threshold voltage Vth or more (Vvr≧Vth), whether or not the voltage Vsw of the ON/OFF signal supplied from the main contact 8*b* remains high for TA seconds is determined (Step S17). When the voltage Vsw of the ON/OFF signal remains high continuously for TA seconds, it is determined that the operator truly removed his/her hands off the operation section 8A and the supply of power to the motor 3 is stopped and further drives the brake 31 (Step S16).

If the voltage Vsw of the ON/OFF signal does not remain high continuously for the TA seconds (Step S17: No), it is determined that an erroneous detection occurs the control goes to step S13. Thus, the motor 3 continues operating as it is.

The time period TA can be set arbitrarily. Moreover, the voltage Vth can be set arbitrarily.

As described above, even if the voltage Vsw of the ON/OFF signal from the main contact 8*b* goes low, unless it is detected that the voltage Vvr of the speed signal from the speed contact 8*a* becomes lower than the threshold voltage Vth, control is exerted so as not to stop the rotation of the motor 3. Therefore, the occurrence of the malfunction can be prevented that, in spite of an operator's no removing his/her hands off the operation section 8A, the voltage Vsw of the ON/OFF signal from the main contact 8*b* goes low due to some reasons such as vibration, noise, or the like and, as a result, an erroneous detection occurs that the operator removed his/her hands off the operation section 8A, causing unintentional stopping of the motor 3.

Further, even when the voltage Vvr of the speed signal Vvr outputted from the speed contact 8*a* is the threshold voltage Vth or more (Vvr≧Vth), if the voltage Vsw of the ON/OFF signal from the main contact 8*b* remains high for TA seconds, the motor 3 stops. Therefore, the occurrence of the malfunction can be prevented that, in spite of an operator's removing his/her hands off the operation section 8A, since the voltage Vvr of the speed signal from the speed contact 8*a* does not drop fully to the threshold voltage Vth, the motor 3 continues to be activated.

The method for detecting whether the voltage Vsw of the ON/OFF signal remains high continuously for TA seconds in the step S17 can be selected arbitrarily. For example, a timer is reset at a start time and, when the determination result in the Step S17 is "No", a count value of the timer is incremented by one (in step S17) and the processing returns back to the Step S13 and, when the count value of the timer reaches the count value corresponding to specified time TA, the determination result in the Step S17 may be "Yes". In this case, when determined "Yes" in step S14, the timer is reset to 0.

Also, when the determination result in the Step S15 is "No", the timer may be started and, when the count value of the timer reaches the count value corresponding to predetermined time TA, the processing in the Step S15 is performed again and, if the result is again "No", the procedure may proceed to the Step S16.

The present invention is not limited to the above embodiment and various modifications and applications are possible in light of the above teaching.

For example, components such as the battery 2, motor 3, or the like may be arbitrarily changed. In the embodiment, an inner rotor type brushless motor is employed exemplarily as the motor 3, however, an outer rotor type brushless motor may be used and a motor having a brush may be selected. Further, for example, by increasing (or decreasing) an effective voltage to be applied to the motor 3, the rotation speed of the motor 3 is raised (or lowered), however, by increasing (or decreasing) a frequency of a driving pulse applied by the inverter section 7, the rotation of the motor 3 may be raised (or reduced). As the winding of the motor 3, Δ-connected winding may be used.

The example in which the motor is inverter-driven is shown, however, the driving method is not limited to the inverter-driving. Depending on a kind of the motor to be employed, the applied voltage may be controlled. Configurations of the inverter section 7 may be changed as appropriate. The trigger switch 8 is exemplarily employed as the operation switch in the embodiment, however, other operation switches may be used in the same way. The method of detecting the presence or absence of operations of the operation switch and the method of detecting an amount of operation are selected arbitrarily and, for example, an encoder or a like may be used. The relation between the stroke L and the voltages Vsw and Vvr shown in FIG. 3 may be changed as appropriate. In the above embodiment, for ease understanding, operations are explained by using positive logic, however, it is natural that processing may be performed by using negative logic. Moreover, the example in which the controller 9 is made up of processors or the like and each function is realized by software are shown in the embodiment, however, the controller 9 may be constituted of discrete circuits. The example in which a timer function of the processor is used as the timer is explained, however, an outer timer may be employed as well. Further, in the above embodiment, the present invention is applied to the impact driver 1, however, it is needless to say that the present invention is not limited to the above embodiment and can be applied to any power tool such as an ordinary electric driver, drill, or the like that is configured to control the rotation speed of a motor according to an amount of operation of an operation section.

It is apparent that various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-245752 filed on Sep. 21, 2007 and including specification, claims, drawings and summary. The disclosure of the above Japanese Patent Application is incorporated herein by reference in its entirety.

What is claimed is:

1. A power tool comprising:

a motor;

a trigger switch operated by a user, the trigger switch having a main contact that is turned ON by operations of the trigger switch and a speed contact that is configured to output a speed signal having a signal level corresponding to an amount of operation of the trigger switch; and a driver that determines the presence or absence of operations of the trigger switch according to an ON/OFF state of the main contact of the trigger switch and controls, when it is determined that the trigger switch has been operated, a rotation speed of the motor in accordance with the amount of operation of the trigger switch; wherein the driver stops the motor, when the main contact is turned OFF, if the level of the speed signal outputted from the speed contact is less than a set level; and the driver maintains rotation of the motor if the level of the speed signal outputted from the speed contact is the set level or more even when the main contact is turned OFF.

2. The power tool according to claim 1, wherein the driver stops the motor if an OFF state of the main contact continues for a predetermined period of time even when the level of the speed signal outputted from the speed contact is the set level or more.

3. The power tool according to claim 1, wherein the driver stops the motor, when the main contact is turned OFF after the motor started once, if the level of the speed signal outputted from the speed contact is less than the set level.

4. The power tool according to claim 1, wherein the driver starts the rotation of the motor when the main contact is turned ON and when the speed contact outputs a speed signal designating a rotation speed.

5. The power tool according to claim 1, wherein the main contact of the trigger switch comprises an ON/OFF switch and is turned ON when the amount of operation of the trigger switch is a first reference amount or more, and the speed contact of the trigger switch comprises a potentiometer and outputs, when the amount of operation of the trigger switch is equal to or greater than a second reference amount being larger than the first reference amount, a speed signal having a signal level which is raised with an increase in the amount of operation of the trigger switch.

6. The power tool according to claim 1, wherein the driver comprises a controller and an inverter circuit to supply power to the motor under control of the controller, wherein the controller controls the inverter circuit so that the motor is made to rotate at a speed corresponding to the speed signal outputted from the speed contact while the main contact is turned ON and controls the inverter circuit so that the motor is made to stop when the level of the speed signal outputted from the speed contact is less than a reference level while the main contact is turned OFF.

7. A power tool comprising:

a motor;

an operation unit configured to be operated by a user;

an operation determining unit configured to determine the presence or absence of an operation of the operation unit;

an operation amount detecting unit configured to detect an amount of operation of the operation unit; and a driver configured to control the motor, when the operation determining unit determines that an operation of the operation unit exists, at a rotation speed corresponding to the amount of operation detected by the operation amount detecting unit; wherein the driver, when the operation determining unit determines that no operation of the operation unit exists, stop the motor if the amount of operation detected by the operation amount detecting unit is less than a reference amount; and the driver, even when the operation determining unit determines that no operation of the operation unit exists, maintains rotation of the motor if the amount of operation detected by the operation amount detecting unit is a predetermined reference amount or more.

8. The power tool according to claim 7, wherein the driver, even when the amount of operation detected by the operation amount detecting unit is the predetermined reference amount or more, stop the motor if a period during which it is determined by the operation determining unit that there exists no operation continues for a predetermined period of time.

9. A power tool comprising:

a motor;

an operation unit configured to be operated by a user and to include a main contact and a speed contact, the main contact being turned ON to supply an electric power to the motor, the speed contact being configured to output a speed signal having a magnitude corresponding to an amount of operation of the operation unit; and a driver configured to stop the motor when the main contact is turned OFF and the magnitude of the speed signal is less than a predetermined level, and to maintain rotation of the motor when the magnitude of the speed signal is more than the predetermined level even if the main contact is turned OFF.

10. The power tool according to claim 9, wherein the driver is configured to stop the motor if an OFF state of the main contact continues for a predetermined period of time.

* * * * *